(12) United States Patent
Ehrhardt (10) Patent No.: US 7,950,616 B2
(45) Date of Patent: May 31, 2011

(54) FORM FITTING CONNECTION BETWEEN SPINDLE AND SPINDLE HOLDER OF SLV GEAR

(75) Inventor: Winfried Ehrhardt, Donaueschinen (DE)

(73) Assignee: IMS Gear GmbH, Eisenbach (DE)

( * ) Notice: Subject to any disclaimer, the term of this patent is extended or adjusted under 35 U.S.C. 154(b) by 1140 days.

(21) Appl. No.: 11/600,843

(22) Filed: Nov. 17, 2006

(65) Prior Publication Data

US 2007/0152485 A1 Jul. 5, 2007

(30) Foreign Application Priority Data

Nov. 23, 2005 (DE) .......................... 10 2005 056 145
Feb. 23, 2006 (DE) .......................... 10 2006 008 989

(51) Int. Cl.
*F16M 13/00* (2006.01)
(52) U.S. Cl. ...................... 248/424; 248/429; 297/344.1
(58) Field of Classification Search .................. 248/424, 248/429; 297/344.11, 344.1, 330
See application file for complete search history.

(56) References Cited

U.S. PATENT DOCUMENTS

| 5,150,872 A | * | 9/1992 | Isomura | ........................ 248/429 |
|---|---|---|---|---|
| 5,727,768 A | * | 3/1998 | Sakamoto | ...................... 248/429 |
| 5,765,798 A | * | 6/1998 | Isomura | ........................ 248/430 |
| 5,873,558 A | * | 2/1999 | Sakamoto | ...................... 248/429 |
| 6,260,922 B1 | * | 7/2001 | Frohnhaus et al. | ........... 297/330 |
| 6,575,421 B1 | * | 6/2003 | Houston et al. | ............... 248/429 |

FOREIGN PATENT DOCUMENTS

| DE | 37 44577 A1 | 7/1989 |
|---|---|---|
| DE | 43 01 241 C2 | 7/1994 |
| DE | 100 03 305 C1 | 6/2001 |
| DE | 102 00 984 A1 | 7/2003 |
| DE | 10 2004 001 624 B3 | 9/2005 |
| EP | 1 068 093 B1 | 1/2001 |
| WO | 86/06036 A1 | 10/1986 |

* cited by examiner

*Primary Examiner* — Terrell McKinnon
*Assistant Examiner* — Steven M Marsh
(74) *Attorney, Agent, or Firm* — The Nath Law Group; Jerald L. Meyer; Jonathan A. Kidney (57) ABSTRACT

The invention relates to a holding device (5) of a seat slide drive for a motor vehicle, wherein the holding device (60) is designed as a metallic block, wherein the holding device (60) is provided with a through-bore (61), in which one end of the spindle (5) is placed and is held there by material (60z) of the holding device (60) pressed into the spindle thread (5a) as spindle (5).

15 Claims, 5 Drawing Sheets

FORM FITTING CONNECTION BETWEEN SPINDLE AND SPINDLE HOLDER OF SLV GEAR

Form fitting connection between spindles and spindle holder of SLV[1] gears by material shaping for the absorption of the crash loads required for this application.

[1] SLV=Schweiβtechnische Lehranstalt, German Welding Institute

The invention relates to a holding device for a motor of a seat slide device in a vehicle according to the features of the preamble of claim 1.

STATE OF THE ART

A known motor for seat slide devices is described in EP 1 068 093 131. The motor is displayed in FIG. 1, both of the aforementioned and in the present application. As can be seen from FIG. 1, a holding plate 1, onto which the seat of a vehicle is to be fixed is associated to an upper rail 3. The holding plate 1 is provided with fastening clips 11 for a motor 2, so that said motor can be fixedly connected to the holding plate 1 and thus to the upper rail. On both sides of the motor 2, motor shafts 21, 22 are arranged. For this purpose, flexible shafts can be used. Said motor shafts 21, 22 form the connection to a gear 9, which is described in detail in EP 1 068 093 B1. Said gear 9 is placed in an U-shaped mounting bracket 8 with fastening holes 8a by means of which the gear 9 is fastened to the upper rail 3.

Figure 1:
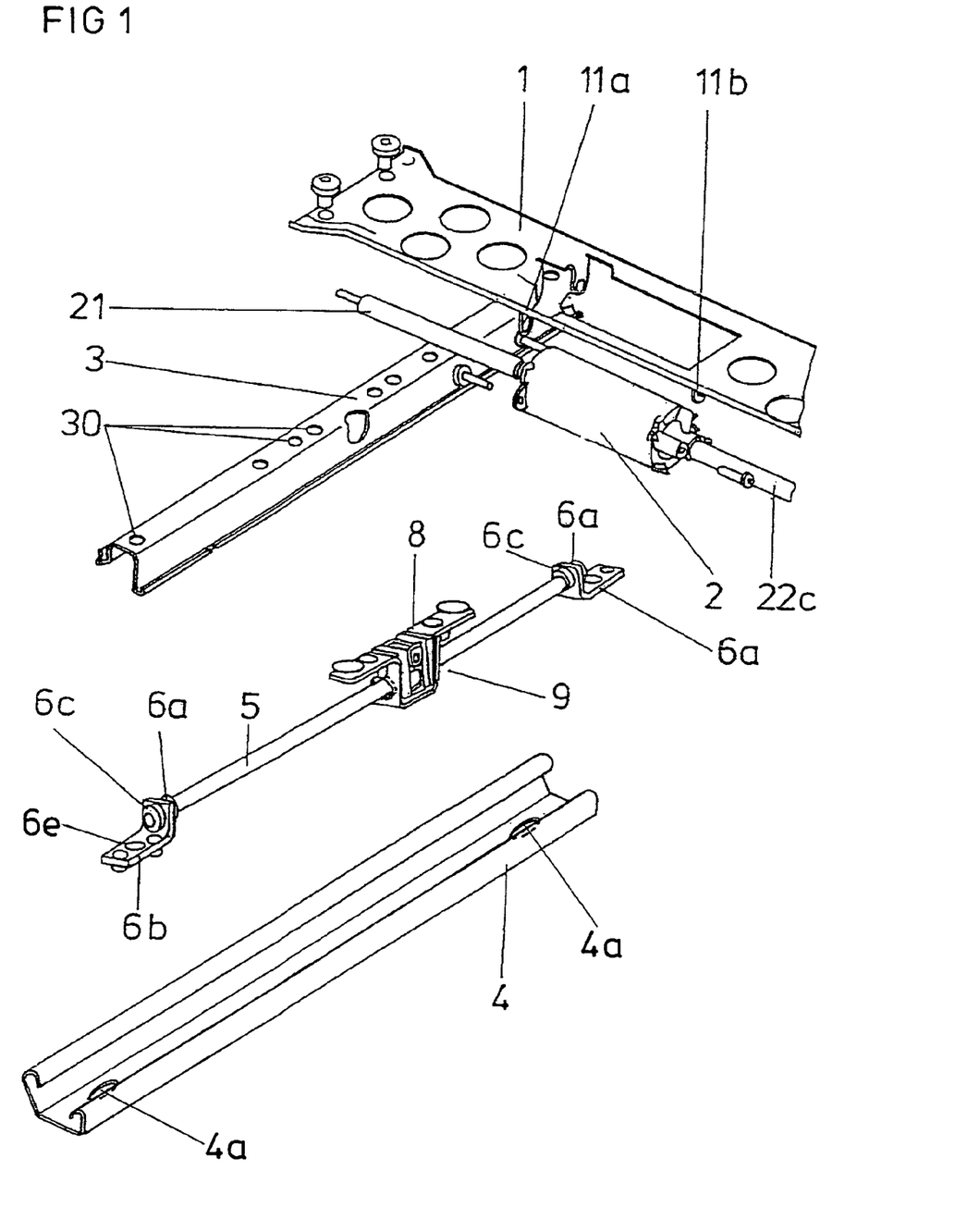
FIG. 1 shows the drive, which was already described according to the state of the art, having a spindle fixed at its ends by means of holding devices on which a longitudinally shiftable gear is placed.

The upper rail 3 glides directly or over adjustment and/or bearing elements (not shown) on a lower rail 4 fastened to the vehicle floor of the motor vehicle. In functional position of the upper rail 3 and the lower rail 4, said rails are held by their contact areas or respectively bearing areas such that a hollow chamber is formed. Within said hollow chamber, a thread spindle 5 is arranged. Said thread spindle 5 is received between holding devices 6a and 6b, which are fixedly arranged on the lower rail 4. For this purpose, the holding devices 6a and 6b dispose of fastening holes 6e through which suitable screw connections or similar fastening means project and are held at fastening holes 4a of the lower rail 4. The spindle 5 itself is screwed on the holding devices 6a and 6b by means of suitable fastening nuts 6c.

The design of the holding devices 6a and 6b of the motor, however, as displayed in FIG. 1 is disadvantageous.

These L-shaped holding devices 6a, 6b are regularly produced as punched and bent parts. Therein, the holding devices, in form of stripe-shaped elements are punched out of metal plates and then bent in a right angle On the one side, such punched and bent parts are comparatively easy to produce and thus economic. On the other side, however, the too low stability of these holding devices is disadvantageous. It is known that such punched out and bent parts can only absorb limited forces in case of a crash. In crash tests it was shown that such punched out and bent parts can only absorb a comparatively low amount of forces of up to about 20 kN without losing their intended function, for example due to fraction.

Further holding devices for seat slide motors are for example described in WO 86/06036 A1, DE 100 03 305 C1 and DE 43 01 241 C2. Of these documents, DE 100 03 305 C1 discloses for example a holding device for the torsion-free fixation of a spindle, which holding device is composed of two shells and, on its inner surface of either one or both of the two shells is provided with a contouring which differs from the thread of the spindle to be fixed. A fixation of the spindle in this two shell holding device is basically achieved by means of the clamping forces, which are created when the two shells are connected, for example by a screwing or riveting connection. Therein, it is disadvantageous that this exemplarily displayed design of fixations or respectively holding devices is connected with comparatively large efforts as far as the production is concerned and due to the assembly based on several individual components, a permanent connection for the required absorption of the forces under all operative conditions can not be guaranteed.

A further solution from the applicant is described in the granted patent DE 10 2004 001 624 B3. In said invention, the spindle ends are permanently fixed, e.g. by means of laser welding, in tray-shaped recesses of the block-like holding device.

Eventually, DE 102 00 984 A1 describes a procedure in which the ends of the spindle are placed in a tube-shaped holding device and are deformed there. This procedure takes place in two axially spaced sections on opposed sides. For said procedure, very high pressure forces are required. Thus, it is disadvantageous that such high pressure forces, due to the sudden deforming procedure, may lead to unintended shape and position tolerances in the spindle, which may again result in a deflection of the spindle.

OBJECTIVES

It is the objective of the present invention to provide a holding device by means of which reliable and permanent form fitting connections between the spindles of a seat slide gear and said spindle holding device can be realized and in which the disadvantages mentioned above are not observed.

The objective is solved by providing a holding device which can receive one end of the spindle of the seat slide drive in a through-bore, said holding device being designed as a metallic block, wherein the spindle is form fittingly and permanently held by material of the holding device pressed into the spindle thread of the spindle.

The advantageous effect of the invention results from the fact that the material selected for the metallic block of the holding device is softer than the material of the spindle and from the fact that a pressing procedure is applied which is applied not suddenly on a big surface area of the metallic block of the holding device, but consists in a deformation process executed continuously over a certain time period and successively on different sections of the holding device, by means of which the unintended shape and position tolerances of the spindle and a consequently cause deflection can be avoided.

Further advantages may result from the fact that the solution according to the invention is an economic alternative for the connection of metallic components by means of welding techniques and is particularly suited for providing permanent and form fitting connections of non-weldable materials or of materials which are difficult to be welded.

Other advantages result from the fact that deformation procedures used for achieving the form fitting and permanent connection according to the invention, have low operational costs and allow for a simple process control in the course of the production process, by means of which, among others, a unproblematic compliance to the necessary shape and position tolerances of the connection to be produced can be guaranteed. Since the use of the specially produced tools is not required for the deformation procedure applied, a corresponding production of the permanent and form fitting connection between spindle and holding device can be carried out without having to face high costs and complex installation procedures in other decentralized production sites.

Embodiments of the invention are objects of the depending claims.

EXEMPLARY EMBODIMENT

The inventive connection between spindle and spindle holding device is explained in detail the following description in connection with other figures by means of an exemplary embodiment. The figures show.

Figure 2:
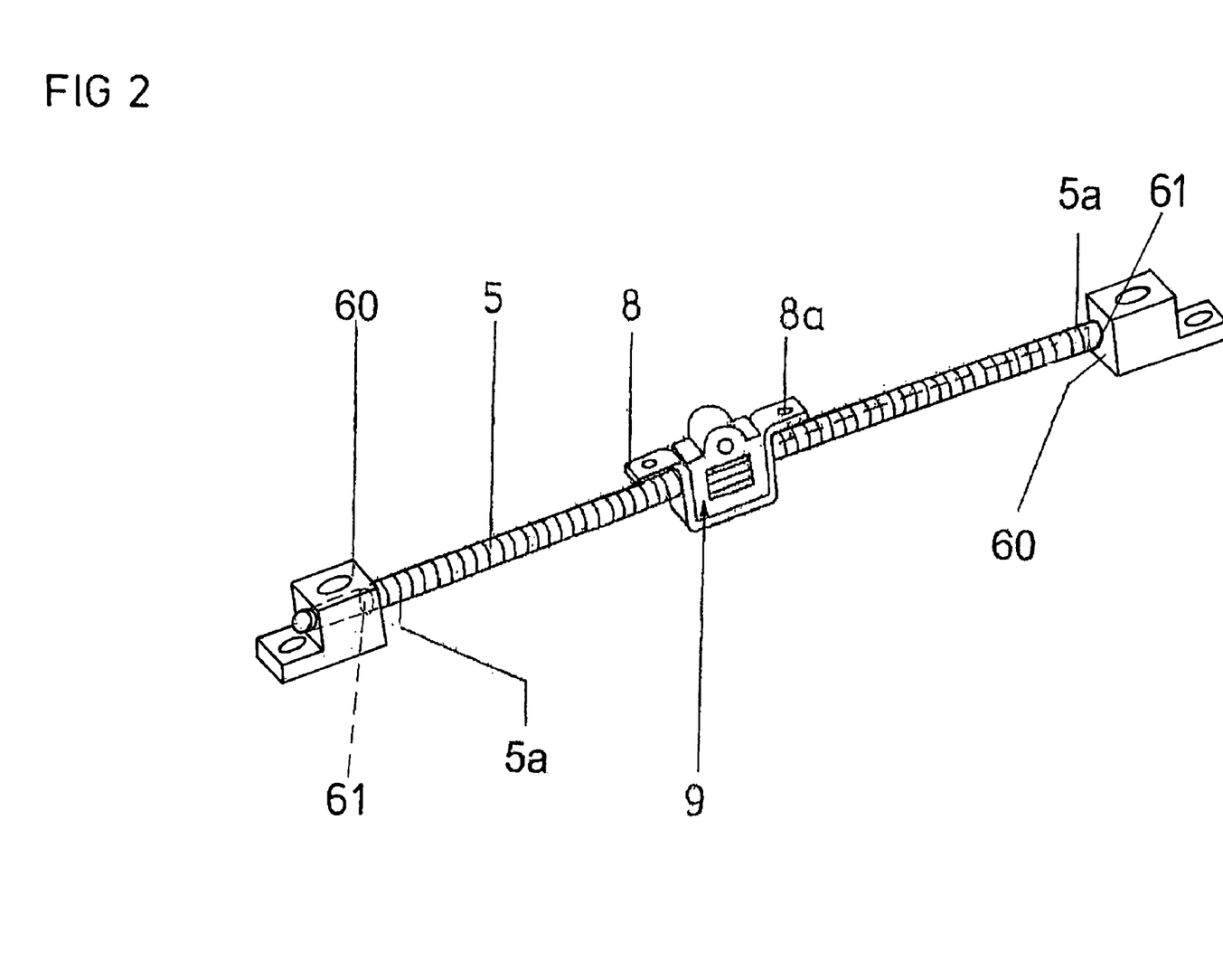
FIG. 2 shows a gear placed on a spindle similar to FIG. 1, but with holding devices which are designed according to an exemplarily embodiment of the invention.

FIG. 2 shows, similar to FIG. 1, a spindle 5 and a gear 9 which can be moved on the spindle 5 along the spindle axis A. The gear 9 is fixed in the already known, U-shaped holding device 8, which can be screwed on the upper rail 3 (see FIG. 1) of a vehicle seat by means of the fastening holes 8a.

In contrast to the illustration of FIG. 1, the spindle 5 is fixedly connected at its ends 5a with particularly designed holding devices 60 which will be further described in connection with FIGS. 3 to 6. In contrast to the holding devices 6a, 6b displayed in FIG. 1 in form of L-shaped punched out and bent parts, said holding devices 60 comprise a compact metallic block provided with a through-bore 61 for the reception of the spindle 5, wherein the spindle 5 is permanently and form fittingly held in the holding device 60 by material of the holding device 60 pressed into the spindle thread of the spindle 5. Therefore, the fixation between spindle 5 and holding device 60 is not realized by simply screwing the spindle 5 into a comparatively thin material section of a punched out and bent part 6a, 6b with the help of screwing connections 6c as displayed in FIG. 1, but by form fittingly pressing the material of the holding device 60 into the thread of the spindle 5 in the area of the through-bore 61, by means of which, in case of a crash, significantly higher forces can be absorbed compared to holding devices made of punched out and bent parts, without unintendedly reducing the intended function, for example the interaction of seat, safety belt and air bag in case of a crash.

Figure 3:
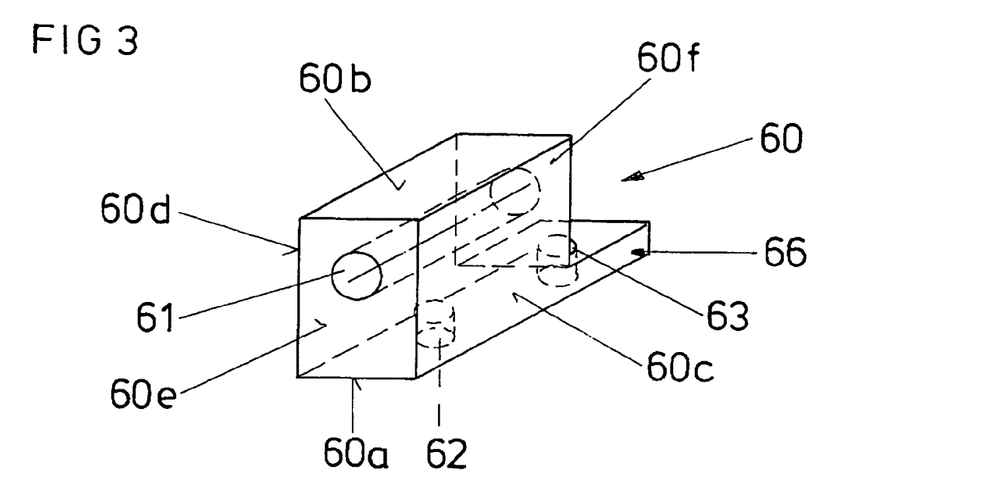
FIG. 3 shows a perspective display of the holding device according to the invention.

FIG. 3 shows a perspective illustration of one embodiment of the inventive holding device 60. The holding device 60 comprises a plate-shaped, horizontal leg 66 and a metallic block delimited by the surfaces 60a, 60b, 60c, 60d, 60e and 60f, wherein said metallic block and the horizontal leg 66 were for example formed out of a massive work piece, for example by milling a single metal block; thus, no additional connection technique which would only lead to a reduction in the stability of the whole structure is required between the leg 66 and the metallic block delimited by the surfaces 60a, 60b, 60c, 60d 60e and 60f.

Therefore, the stability of the hole structure is due only to the characteristics of the material used and the material strengths used; and in contrast to the L-shaped structure formed by bending of a punched part as described above, it is not to be expected that the structure of the holding device 60 in the transitional area between the leg 66 and the metallic block delimited by the surfaces 60a, 60b, 60c, 60d, 60e and 60f is not affected during production.

Furthermore, the holding device 60 according to FIG. 3 comprises a fastening hole 63 disposed in the plate-shaped horizontal leg 66 and a fastening hole 62 disposed in the metallic block delimited by the surfaces 60a, 60b, 60c, 60d, 60e and 60f. Moreover, the holding device 60 according to FIG. 3 further comprises a through-bore 61 extending between the front surfaces 60e and 60f of the metallic block.

In this contest, the holding device 60 also has an L-shaped design, as shown in the perspective display according to FIG. 3, and is provided with a plate-shaped horizontal leg 66 as well as with a vertical leg which is formed as a massive piece out of full material with a floor area 60a, two opposed surfaces 60c, 60d, two opposed front surfaces 60e, 60f and one upper surface 60b, wherein in the exemplary embodiment according to FIG. 3 the opposed surfaces 60a and 60b, 60c and 60d as well as 60e and 60f are parallel to each other and the surfaces which are not parallel to each other, such as for example 60b and 60c or 60b and 60d meet each other in a right angle so that all in all a cuboid-like structure is formed.

The vertical leg of the holding device which is delimited by the surfaces 60a to 60f described above is not limited to the strict right angled design as shown in this exemplary embodiment, but may have any other suitable shape, as required for an optimized application (free space at disposal, potentially required adaptation to the contours of the reception of the holding device, etc.) provided that the inventive form fitting connection between the holding devices 60 and the spindle 5 of the required stability is guaranteed.

Figure 4:
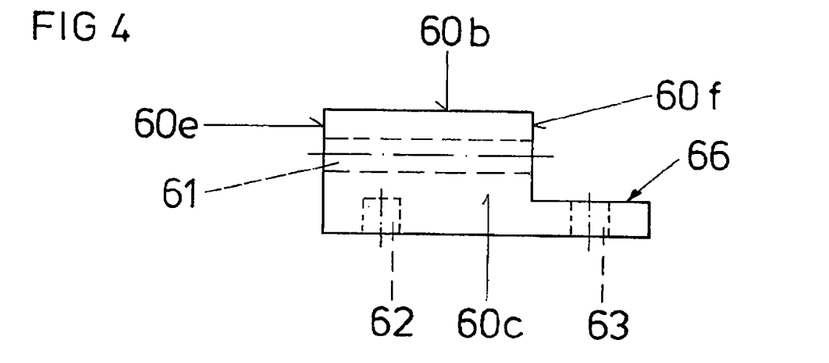
FIG. 4 shows a perspective display of the profile of the device according to the invention.

FIG. 4 also shows the holding device according to FIG. 3 in a simple illustration of the profile and comprises a first fastening hole 62 and a second fastening hole 63, an horizontal leg 66 and a through-bore 61 for the reception and permanent fixation of the spindle 5.

The plate-shaped, horizontal leg 66 is provided with at least one fastening hole 63. Said fastening hole 63 in connection with the optionally provided fastening hole 62 in the metallic block delimited by the surfaces 60a, 60b, 60c, 60d, 60e and 60f serves for the fixation of the holding device 60 via the lower guide rail 4 (cp. FIG. 1) to the vehicle floor by means of suitable fastening element, e.g. screws.

In the case of the at least one fastening hole 63, the fastening elements can for example be screw connections or rivet connections. If screw connections are used, the first fastening hole 63 may for example be provided with an inner thread, by means of which thread the connection to the lower rail 4 and to the vehicle floor is realized by means of screwing in a screw of the corresponding thread and corresponding stability (tensile strength or respectively shear strength of the screw) exceeding the required crash loads.

Alternatively, it is also possible that the fastening hole 63 is designed as a through-bore without a thread and with corresponding diameter to realize a connection to the lower rail 4 and to the vehicle floor by screwing a screw of corresponding stability projecting through the through-bore to a corresponding nut, for example a self-locking clamping nut.

The diameter of the screw and the diameter of the at least one fastening hole 63 are selected such that the screw, on the one hand, can be led through the fastening hole 63 in a sufficiently easy manner during the installation process and that, on the other hand, the tolerance between the outer diameter of the screw and the inner diameter of the fastening hole 63 is low, so that the forces acting on the seat and thus on the holding device 60 in case of a crash can be transferred in a sufficient quantity to the lower rail 4 and the vehicle floor.

At the same time, the dimensions of the horizontal leg 66, such as material strength, length and width are also selected in such way that the absorption and transfer of the maximum of forces to be tolerated in case of a crash does not cause destructions and lies within the range of the predetermined deformation tolerances.

In contrast to the at least one fastening hole 63 in the horizontal leg 66, the fastening hole 62 displayed in FIG. 4 and already known from FIG. 3 is an optional hole and not a through-bore, but a countersink of determined depth. In the case of the fastening hole 62, the fastening elements may for example consist in a screw connection or in the reception of a counter part of corresponding shape which fits exactly into the fastening hole 62 which is arranged, for example, on the lower rail 4. If screw connections are used, the first fastening hole 62 may for example be provided with an inner thread, by means of which thread the connection to the lower rail 4 and to the vehicle floor by means of screwing-in a screw of the corresponding thread, the corresponding length and of the corresponding stability (tensile strength or respectively shear strength of the screw) which exceeds the crash loads required.

If a sufficient mechanic stability of the connection between the holding device 60 and the lower rail 4 or respectively the vehicle floor, particularly in axial direction of the fastening hole 63 can already be achieved with the help of the fastening via the fastening hole 63, the fastening hole 62 as described above in an embodiment of the holding device 60 without inner thread as simple countersink can be realized in a production process which is simpler and thus more economic.

Said countersink can serve for the reception of an exactly fitting counter part arranged for example on the lower rail 4, which by the realization of the fastening in the fastening opening 63 is reliably fixed in the fastening hole 62 and thus a predetermined alignment of the holding device 60 in axial direction to the spindle 5 is ensured. Furthermore, this embodiment of the fastening described can absorb high lateral forces, provided that it has the right dimensions and fits exactly, which forces then do not have to be transferred over the fastening of the fastening hole 63 alone. Last but not least, this solution also is advantageous regarding time and sometimes costs required for the installation of the holding device 60, since in that case, only one single screw connection has to be produced, but precise orientation of the holding device 60 and the absorption of high lateral forces are guaranteed at the same time.

Figure 5:
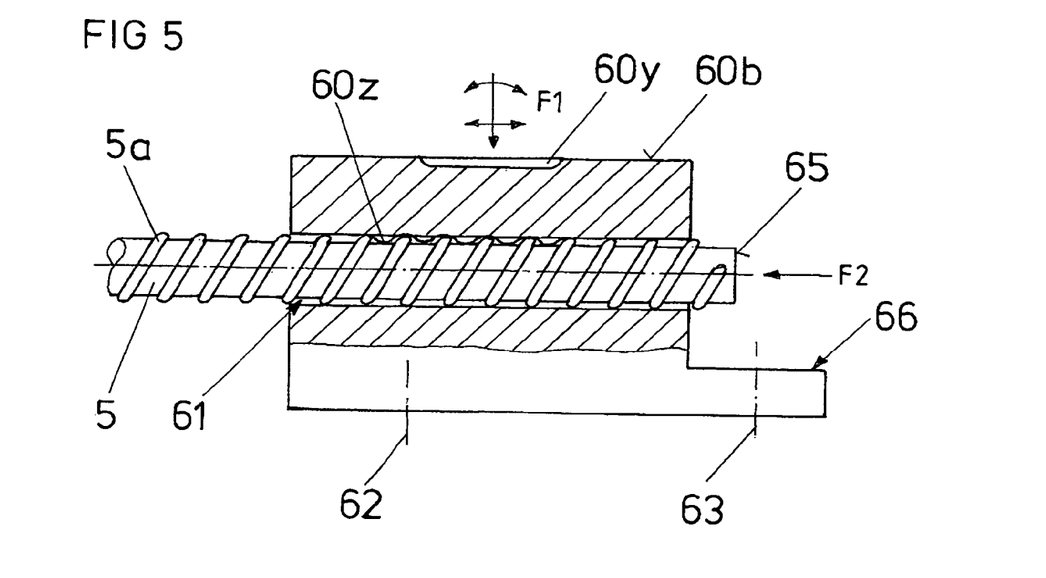
FIG. 5 shows the display of the profile of the holding device according to the invention with a spindle placed in the through-bore.

FIG. 5 shows a profile of the holding device 60, wherein the end of the spindle 5, placed in the through-bore 61 of the holding device 60 as intended by the invention is displayed. Therein, the diameter of the through-bore 61 is selected such that the spindle 5, on the one hand, can be inserted in said through-bore 61 without increased expenditures of force being required, but, on the other hand, the tolerance between the outer diameter of the spindle determined by the spindle thread 5a and the inner diameter of the through-bore 61 is low enough to ensure that during the later deformation of the holding device 60 and the spindle 5, a sufficient material flow of the material in the holding device 60 into the spindle thread 5a to achieve the intended form fitting and permanent connection between the holding device 60 and the spindle 5 with sufficient stability can be realized.

F1 in FIG. 5 exemplarily describes a possible position and a possible direction of at least one action of force during the realization of the form fitting connection between the holding device 60 and the spindle 5. Said force is applied by means of a suitable tool, for example a die, which is slightly chamfered on the front side, by means of which the force onto the work piece to be processed is applied, which in the present case is represented by the holding device 60. The force is basically applied in perpendicular direction to one of the surfaces of the holding device 60, in the example displayed in FIG. 5 perpendicularly to the surface 60b. During the processing of the holding device 60, the die applying the force is additionally tilted by a predetermined angle from a perpendicular position in relation to the surface to be processed in form of a turning movement around the contact point of the stamp on the surface, namely successively in all directions within a radius of 360 degree.

Thanks to the lurching movement of the force-applying die (pressing tool) resulting therefrom, a continuous plastic deformation of the material of the holding device 60 in the area in which this force is applied is achieved which also extends into the deeper areas of the material. By the appropriate selection of the amount of force F1 applied, the range of the force impact in the material, in the present case the holding device 60, can be adapted as required.

In the present example, the material strength of the material surrounding the through-bore 61 for the reception of the spindle 5 is selected such that, on the one hand, a sufficient resistance of the holding device 60 to the forces acting in case of a crash is ensured and that, on the other hand, the plastic deformation of the material of the holding device 60 within the area of the spindle thread 5a caused by the force impact F1 described provokes a material flow of the material of the holding device 60, by means of which, according to the invention, material 60z of the holding device 60 is reliably and permanently pressed into the spindle thread 5a of the spindle 5. At the same time, a depression 60y is formed on the surface 60b of the holding device 60.

In contrast to the procedure described further above, concerning the sudden deformation of large areas of a work piece according to the state of the art by one-time, short-term, simultaneous application of force on a larger area, the force impact F1 is restricted to the area closely surrounding the respective place of force application at any moment of the process of plastic deformation of the material of the holding device 60, which advantageously means that compared to deformation processes according to the state of the art, significantly reduced deformation forces (peak forces) can be applied for a longer period; thus a plastic deformation is achieved, which is realized in small steps helping to avoid undesired shape and position tolerances of the spindle 5 which might lead to an unintended deflection of the spindle 5.

In order to realize an overall stability as required for a form fitting and permanent connection between the holding device 60 and the spindle 5, the die applying the force F1 is not only used over a certain time period at one point of the holding device 60 in the lurching movement as described; but additionally, it is also moved on the surface of the holding device 60 in a way that a force effect F1 on a certain area of the material of the holding device 60 is achieved and thus material 60z of the holding device 60 in the area of the through-bore 61 is pressed into the spindle thread 5a of the spindle 5 in a correspondingly vast section.

According to the invention, the materials for the holding device 60 and the spindle 5 are selected in such a way that the material of the metallic block of the holding device 60 delimited by the surfaces 60a, 60b, 60c, 60d, 60e and 60f and having the through-bore 61 for the reception of the spindle 5 is softer than the material of the spindle 5. It is the objective to maintain the original structure of the spindle thread 5a even after the deformation process within the area of the through-bore 61, at least to a large extend.

Thus, it is ensured that by the plastic deformation of the material of the holding device 60 in the area in which the force (F1) was applied caused by the pressing procedure, a material flow of the softer material of the holding device 60 into the thread 5a of the spindle 5 formed of a harder material occurs and thus the intended form fitting, permanent connection between spindle 5 and holding device 60 of the required stability is achieved. In this connection it was found to be advantageous that the material used for the holding device 60 was about 20% to 30% softer than the material used for the spindle 5.

In the present case, experiments regarding the inventive grouting procedure were carried out with a spindle 5 made of 100CR6 steel and a holding device 60 made of machine steel. The respective results are given in FIG. 7 and are explained beneath.

As indicated above, the force F1 is typically applied over a larger area. Thus, the force F1 is applied to at least one area on at least one of the surfaces defining the metallic block of the holding device 60 with the through-bores 61.

The force F1 is typically applied to the surface 60b, by which procedure the material of the holding device 60 facing this upper surface 60b in the area of the through-bore 61 is pressed into the spindle thread 5a of the spindle 5.

Since according to the invention, the spindle 5 is made of a harder material compared to the holding device 60, a consequence of the force impact F1 on for example an upper surface 60b, force is also applied to the transitional area of the spindle 5 and the area of the through-bore 61 (here: the area in the direction of the transitional surface 60a) opposed to the upper surface 60b, which leads to a plastic deformation resulting in a material flow of the softer material of the holding device 60 into the harder material of the spindle thread 5a, but to a minor degree than in the area in which the force (F1) is directly applied.

In further embodiments of the present invention, however, the corresponding deforming force F1 can also be applied to several separated surface sections on one of the surfaces defining the metallic block of the holding device; or for example respectively on one or more separated surface section on several surfaces defining the metallic block of the holding device. Said surfaces may typically be opposed surfaces, but may also be aligned in any other combination of size and number of surfaces to which force is applied as well as the directions for the force impact F1, wherein useful stability is only achieved when force is applied to the surfaces which are aligned laterally to the axis of the spindle 5.

In this way, possible requirements in the production process of the connection between the holding device 60 and the spindle 5, which might result from the fact that all of the surfaces defining the metallic block with the through-bore 61 are not accessible for the application of the force effect, can be flexibly met Thus, essential values for the stability of the connection between the holding device 60 and the spindle 5 consist, among others, in:

length and diameter of the bore-through 61 which defines the maximal surface at disposal for the pressing procedure, wherein the diameter of the through-bore 61 corresponds to the diameter of the spindle 5 and wherein the length of the through-bore depends on the dimensions of the holding device 60.

number, size and alignment of the surfaces selected for the application of F1 for the pressing procedure value of the mechanical force impact F1 and size of the die applying the force impact F1 direction of the force impact in relation to the spindle axis, wherein the maximal desired material flow of the material of the holding device into the spindle thread is achieved when the force is applied vertically to the spindle axis on surfaces of the holding device 60 which are in parallel position to the spindle axis and thus to the through-bore 61.

absolute and relative hardness of the materials for the spindle 5 and the holding device 60

As mentioned further above, the materials used for the holding device 60 or respectively the spindle 5 in the present exemplary embodiment were machine steel or respectively 100CR6 steel; but basically all materials are suitable which can be plastically deformed, by means of which process the intended difference in the hardness for the spindle 5 and the holding device 60 and particularly the required stability of the connection between spindle 5 and holding device 60 can be achieved.

As can be seen from FIG. 5, before the pressing procedure with the holding device 60, the spindle 5 may be optionally placed in the through-bore 61 in such position that a certain part of the front side end 65 of the spindle 5 projects from the through-bore 61, wherein the accessibility of the connection to be realized by means of the fastening hole 63 is not impaired. This front side area 65 of the spindle 5 projecting from the through-bore 61 can be used, according to the invention, in order to flatten down or rivet the spindle 5 in said front side area 65.

By means of the flattening down or riveting procedure, material of the spindle flows around the front side of the holding device 60 within the area of the through-bore 61, by means of which an additional stability of the connection can be achieved, also increasing the overall stability of the connection. The force impact on the front side end of the spindle 5 required for the flattening down or riveting procedure, is exemplarily indicated with F2 in FIG. 5. Known productive processes according to the state of the art are used for the flattening down or riveting procedure.

Figure 6:
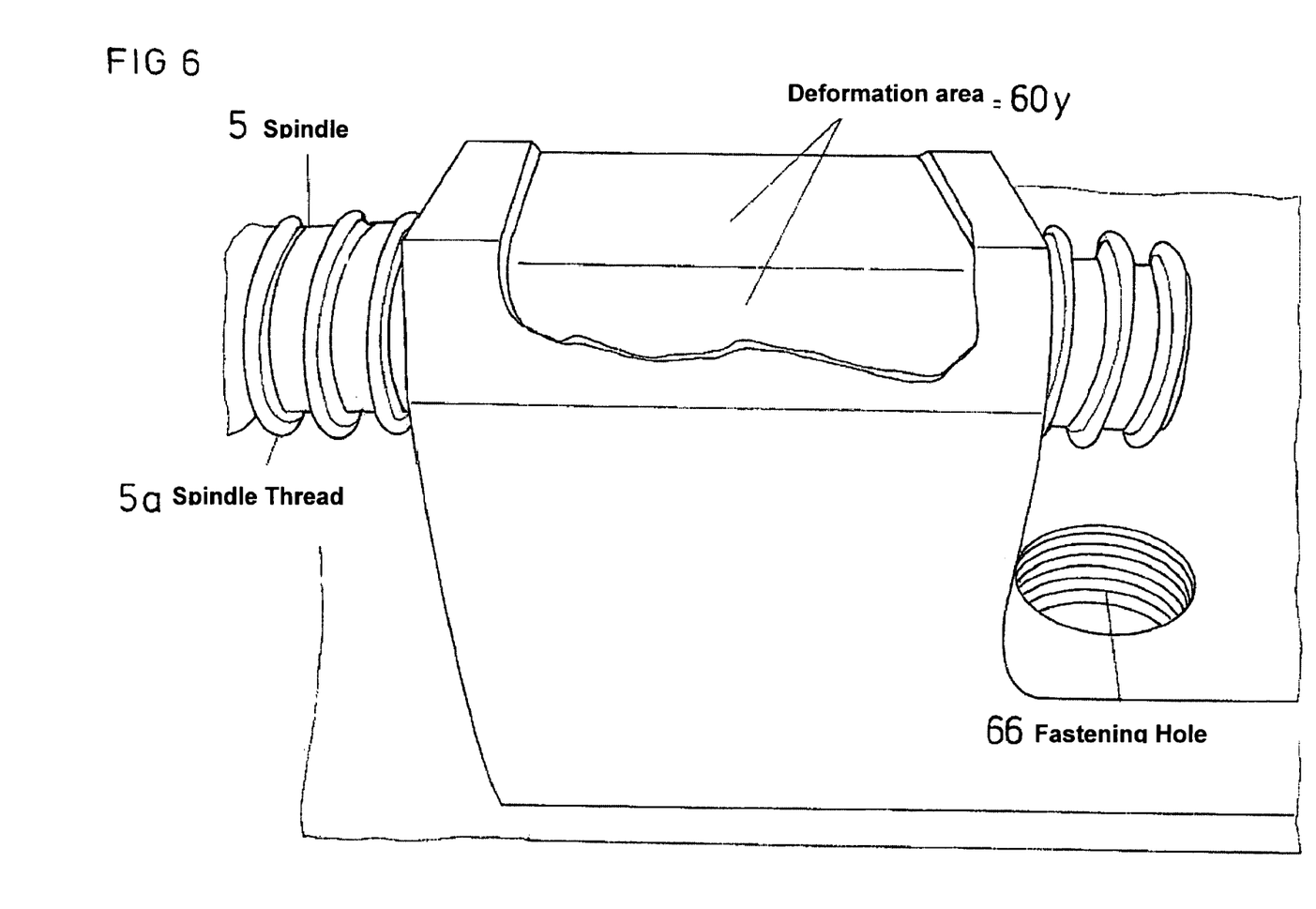
FIG. 6 shows an exemplary embodiment of the completed inventive holding device with the deformation area FIG. 7 display of the material flow caused by the pressing procedure and the deformation of the spindle by means of a processed embodiment If not indicated otherwise, the same reference numbers stand for the same parts with the same meaning.

FIG. 6 shows the drawing of an exemplarily realized embodiment of the present invention in pressed state. In this picture, the spindle with the spindle thread (corresponding to spindle 5 and spindle thread 5a from FIG. 5) can be seen, wherein a certain part of the end of the spindle projects over the through-bore (on the right hand side of the picture; cp. FIG. 5). As described above, this area of the spindle can be optionally used in order to flatten down or rivet the spindle within said front side area and to thus achieve an increased stability of the whole connection.

Also, as can be seen in FIG. 6, the fastening hole in the horizontal leg of the holding device (corresponding to the horizontal leg 66 in FIGS. 3 and 4 and the fastening hole 63 in FIGS. 3 to 5) is situated on the right lower side, wherein the fastening opening of this example is provided with an inner thread. Also, the vertical leg of the holding device defined by the corresponding surfaces and designed as massive block in full material can be seen. As can be seen from FIG. 6, the surfaces defining the vertical leg of the holding device are not limited to an right angled arrangement; thus, surface 60b from FIGS. 3 to 5 is herein replaced by three surfaces, wherein one surface is still horizontally aligned, but two surfaces are diagonally aligned; an arrangement which results in a roof-like structure. All surfaces in this example, however, are aligned parallely to the axis of the spindle.

Furthermore, in FIG. 6 the surface area affected by the force impact (corresponding to F1 in FIG. 5) for the pressing of the holding device and the spindle is illustrated. The force impact was applied on a large area of the horizontal surface of the vertical leg of the holding device, as well as on one partial area of the diagonally aligned surfaces described above respectively. The deformation of the material of the holding device can be seen clearly, which is expressed by a lower surface compared to the original material in the application area of the force impact. Also, the bulge of material on the surface of the holding device, particularly in the area of the diagonal surfaces caused by the mechanical application of force can be seen. The bulge is removed together with other sharp-edged areas or grates during the following production process in order to for example avoid injuries when handling the device or non-compliance with tolerances due to projecting material components.

Figure 7:
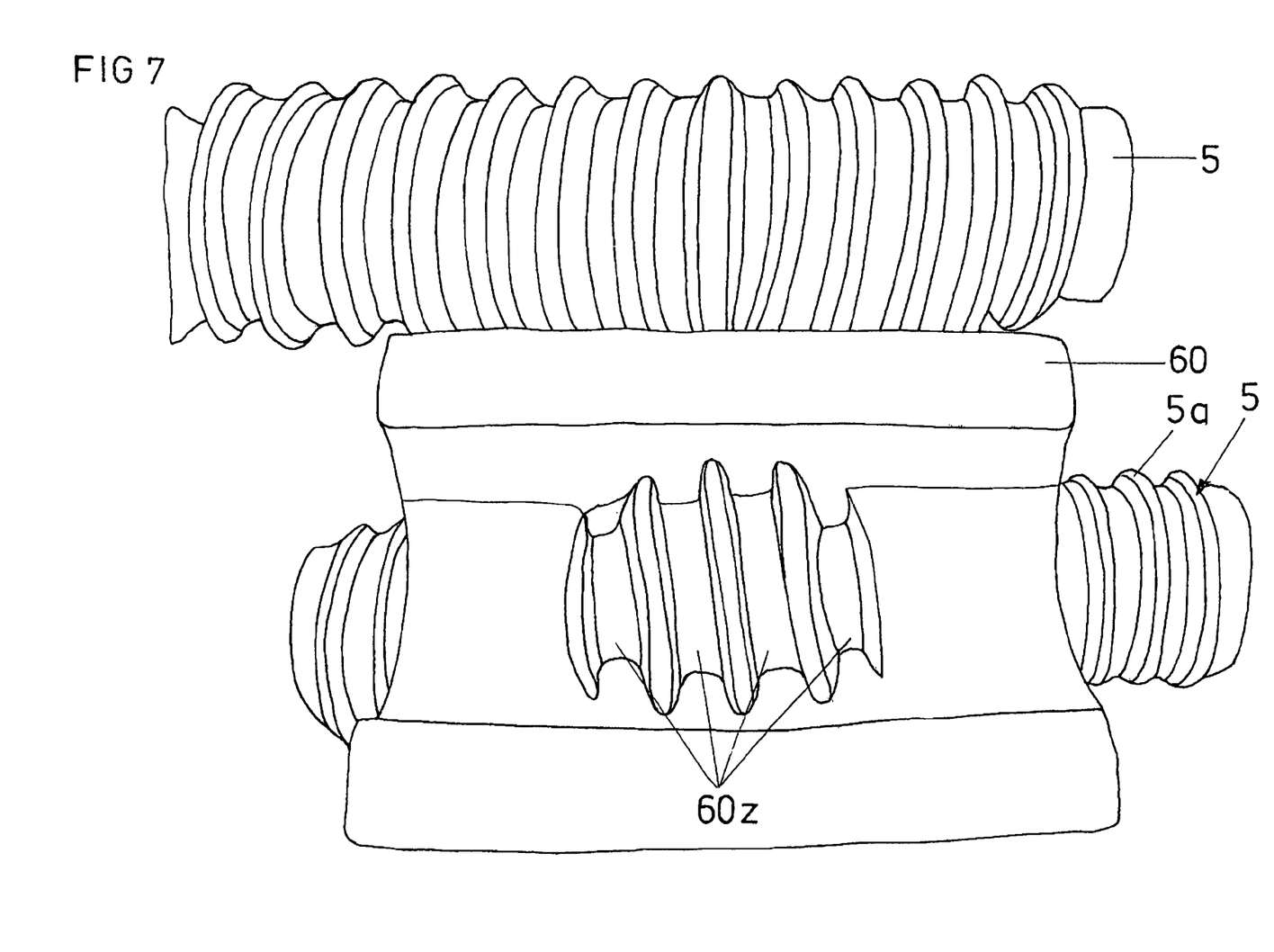

FIG. 7 gives examples for the material flow caused by the inventive pressing procedure in the upper section of the through-bore, that is the area facing the force impact (right side of the drawing), as well as an example for the deformation of the spindle or respectively of the spindle thread by the force effect during the pressing procedure (left side of the drawing). Even though, as expected, a certain deformation of the spindle or respectively of the spindle thread within the area of the deformation and thus of the through-bore can be seen, it is obvious that the basic structure of the spindle thread remains intact and thus a material flow into the thread (see right side of FIG. 7) leads to the form fitting, permanent and highly stable connection as intended between the spindle and the holding device due to the interlocking caused by said material flow.

LIST OF REFERENCE NUMBERS

A Spindle Axis
1 Holding Plate
2 Motor
3 Upper Rail
4 Lower Rail
4a Fastening Hole
5 Spindle
5a Spindle Thread
6a Holding Device
6b Holding Device
6c Screw Connection
6e Fastening Hole
8 Holding Bracket
8a Fastening Hole
9 Gear
11 Fastening Clip
21 Motor Shaft
22 Motor Shaft
60 Holding Device
60a Surface
60b Surface
60c Surface
60d Surface
60e Surface
60f Surface
60z Material flown into the thread 5a of the spindle 5
60y Depression
61 Through-Bore
62 Fastening Hole
63 Fastening Hole
65 Front Side of the Spindle
66 Leg
F1 Force Impact
F2 Force Impact

The invention claimed is:

1. Holding device and spindle of a seat slide motor for a vehicle,
wherein the holding device is designed as a metallic block, and the spindle has a spindle thread,
characterized in that the holding device is provided with a through-bore into which one end of the spindle is placed and is form fittingly and permanently held there by material of the holding device pressed into the spindle thread of the spindle by a deformation process of the holding device to provide a permanent and form fitting connection between the spindle and the holding device.

2. Holding device and spindle according to claim 1, characterized in that the metallic block of the holding device is softer than the spindle.

3. Holding device and spindle according to claim 2, characterized in that the spindle consists of steel and the holding device consists of steel.

4. Holding device and spindle according to claim 3, characterized in that the spindle consists of 100CR6-steel and that the holding device consists of machine steel.

5. Holding device and spindle according to claim 4, characterized in that the material of the holding device is about 20% to 30% softer than the material of the spindle.

6. Holding device and spindle according to claim 5, characterized in that the metallic block of the holding device is cuboid-shaped, with a floor area, two opposing surfaces, two opposing front surfaces and one upper surface.

7. Holding device and spindle according to claim 6, characterized in that the through-bore extends between the two front surfaces.

8. Holding device and spindle according to claim 7, characterized in that material of the holding device is pressed in one section of the spindle thread.

9. Holding device and spindle according to claim 8, characterized in that the spindle thread is at least to a large extent undeformed in that section.

10. Holding device and spindle according to claim 9, characterized in that a front end of the spindle projects from the through-bore and is flattened down or respectively riveted there.

11. Holding device and spindle according to claim 10, characterized in that the metallic block of the holding device has an L-shaped extension.

12. Holding device and spindle according to claim 11, characterized in that the L-shaped extension extends to the floor area on one side.

13. Holding device and spindle according to claim 12, characterized in that said device is provided with at least one fastening hole on its floor area.

14. Holding device and spindle according to claim 13, characterized in that the front end of the spindle projects from a front side of the holding device and is flattened down or respectively riveted there.

15. Holding device and spindle according to claim 14, characterized in that two deformation areas are provided side by side on the holding device.

* * * * *

UNITED STATES PATENT AND TRADEMARK OFFICE
CERTIFICATE OF CORRECTION

PATENT NO. : 7,950,616 B2
APPLICATION NO. : 11/600843
DATED : May 31, 2011
INVENTOR(S) : Winfried Ehrhardt Page 1 of 1

It is certified that error appears in the above-identified patent and that said Letters Patent is hereby corrected as shown below:

On the Title page, Item (75),
please change inventor's city:

Please delete
Item "(75) Inventor:   Winfried Ehrhardt, Donaueschinen (DE)"
and replace with
Item --(75) Inventor:   Winfried Ehrhardt, Donaueschingen (DE)--

Signed and Sealed this
Ninth Day of August, 2011

David J. Kappos
*Director of the United States Patent and Trademark Office*